US012645494B2

(12) United States Patent
Tanach et al.

(10) Patent No.: US 12,645,494 B2
(45) Date of Patent: *Jun. 2, 2026

(54) METHOD AND SYSTEM FOR SEQUENCING ARTIFICIAL INTELLIGENCE (AI) JOBS FOR EXECUTION AT AI ACCELERATORS

(71) Applicant: NeuReality Ltd., Caesarea (IL)

(72) Inventors: Moshe Tanach, Bet Herut (IL); Yossi Kasus, Haifa (IL)

(73) Assignee: NeuReality Ltd., Caesarea (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,734

(22) Filed: Dec. 29, 2023

(65) Prior Publication Data

US 2024/0184624 A1       Jun. 6, 2024

Related U.S. Application Data

(63) Continuation of application No. 17/018,628, filed on Sep. 11, 2020, now Pat. No. 11,915,041.

(60) Provisional application No. 62/899,428, filed on Sep. 12, 2019.

(51) Int. Cl.
| | |
|---|---|
| *G06F 9/48* | (2006.01) |
| *G06F 9/38* | (2018.01) |
| *G06F 9/50* | (2006.01) |
| *G06F 9/54* | (2006.01) |
| *G06N 3/08* | (2023.01) |
| *G06N 3/063* | (2023.01) |

(52) U.S. Cl.
CPC .......... *G06F 9/4881* (2013.01); *G06F 9/3856* (2023.08); *G06F 9/5027* (2013.01); *G06F 9/544* (2013.01); *G06N 3/063* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,378,044 B1 | 6/2016 | Gaurav et al. | |
| 9,921,639 B2 | 3/2018 | Bose et al. | |
| 10,942,767 B2 * | 3/2021 | Chandra .................. G06N 3/02 |
| 11,487,585 B1 * | 11/2022 | Gilliland ............... G06F 9/5044 |
| 2011/0023029 A1 | 1/2011 | Diab et al. | |
| 2011/0131580 A1 * | 6/2011 | Krishnamurthy ..... G06F 9/5094 |
| | | | 718/102 |
| 2011/0239203 A1 | 9/2011 | Sukumaran et al. | |

(Continued)

*Primary Examiner* — Abu Zar Ghaffari

(74) *Attorney, Agent, or Firm* — M&B IP Analysts, LLC

(57) ABSTRACT

A method for use with an artificial intelligence (AI) sequencer that is at least partially circuitry implemented and is adapted to be coupled to a plurality of AI accelerators via electronic connection, the method comprising: dispatching by the sequencer, using the electronic connection, an initial stage of an AI job having a plurality of stages to at least one of the AI accelerators for execution of the initial stage, wherein the AI job includes multiple AI functions; upon completion of the initial stage, receiving the AI job back at the sequencer; and, thereafter, dispatching by the sequencer, using the electronic connection, a next stage of the AI job to at least one different one of the AI accelerators; wherein the sequencer dispatches each AI function of the AI job at computer speed over the electronic connection to minimize any possible idle time of the AI accelerators.

13 Claims, 9 Drawing Sheets

(56)                References Cited

U.S. PATENT DOCUMENTS

| | | | |
|---|---|---|---|
| 2012/0209794 A1 | 8/2012 | Jones, III | |
| 2013/0231495 A1* | 9/2013 | Leitner | C07C 269/04 |
| | | | 560/25 |
| 2014/0115594 A1* | 4/2014 | Hankins | G06F 9/4843 |
| | | | 718/102 |
| 2014/0245313 A1* | 8/2014 | Otenko | G06F 9/5038 |
| | | | 718/103 |
| 2015/0089495 A1 | 3/2015 | Persson et al. | |
| 2015/0193431 A1 | 7/2015 | Stoytchev et al. | |
| 2015/0355948 A1* | 12/2015 | Bass | G06F 9/4843 |
| | | | 718/104 |
| 2015/0379072 A1* | 12/2015 | Dirac | G06N 20/00 |
| | | | 707/693 |
| 2017/0123861 A1* | 5/2017 | Otenko | G06F 9/526 |
| 2017/0220499 A1 | 8/2017 | Gray | |
| 2018/0150299 A1* | 5/2018 | Balle | G06F 13/4022 |
| 2018/0302277 A1 | 10/2018 | Shimamura et al. | |
| 2018/0307971 A1 | 10/2018 | Sinha et al. | |
| 2019/0050715 A1* | 2/2019 | Ooi | G06N 3/063 |
| 2019/0139182 A1* | 5/2019 | Nurvitadhi | G06F 9/3895 |
| 2019/0205736 A1 | 7/2019 | Bleiweiss et al. | |
| 2019/0205737 A1* | 7/2019 | Bleiweiss | G06N 3/063 |
| 2019/0205745 A1* | 7/2019 | Sridharan | G06F 9/5061 |
| 2019/0266015 A1 | 8/2019 | Chandra et al. | |
| 2019/0291277 A1 | 9/2019 | Oleynik | |
| 2019/0303324 A1 | 10/2019 | Lantz et al. | |
| 2019/0317802 A1 | 10/2019 | Bachmutsky et al. | |
| 2019/0324444 A1 | 10/2019 | Cella et al. | |
| 2019/0332422 A1 | 10/2019 | Liu et al. | |
| 2019/0347125 A1 | 11/2019 | Sankaran et al. | |
| 2019/0394083 A1 | 12/2019 | Sglavo et al. | |
| 2020/0089532 A1 | 3/2020 | Shimamura et al. | |
| 2020/0133741 A1 | 4/2020 | Lie et al. | |
| 2020/0174840 A1* | 6/2020 | Zhao | G06N 3/084 |
| 2020/0249996 A1 | 8/2020 | Kumar Addepalli et al. | |
| 2020/0250510 A1 | 8/2020 | Addepalli et al. | |
| 2020/0311569 A1* | 10/2020 | Ghosh | G06N 3/08 |
| 2020/0319919 A1 | 10/2020 | Che et al. | |
| 2021/0004668 A1 | 1/2021 | Moshovos et al. | |
| 2021/0073170 A1* | 3/2021 | Liao | G06F 15/7807 |
| 2021/0117246 A1 | 4/2021 | Lal et al. | |
| 2021/0264257 A1* | 8/2021 | Hu | G06F 9/5077 |
| 2021/0279475 A1 | 9/2021 | Tusch et al. | |
| 2022/0066409 A1* | 3/2022 | Soler Garrido | G05B 19/056 |

* cited by examiner

METHOD AND SYSTEM FOR SEQUENCING ARTIFICIAL INTELLIGENCE (AI) JOBS FOR EXECUTION AT AI ACCELERATORS

CROSS-REFERENCE TO RELATED APPLICATIONS

This application is a continuation of U.S. patent application Ser. No. 17/018,628 filed on Sep. 11, 2020, which in turn claims the benefit of U.S. Provisional Application No. 62/899,428 filed on Sep. 12, 2019, the contents of both of which are hereby incorporated by reference.

TECHNICAL FIELD

The disclosure generally relates to system architectures, and more specifically to embedded computing architectures and reconfigurable computing architectures to allow acceleration of artificial intelligence task processing.

BACKGROUND

Current computing requirements include increasing demands for artificial intelligence (AI) processing systems and AI computing power that can efficiently support high-demand processing. These needs and demands are due in part to the increased popularity of machine learning and AI applications. The execution of such applications is performed by servers configured as dedicated AI server or AI appliances, including software and hardware. The software realized as an AI framework, such as TensorFlow®, Caffe, Pytorch®, or CNTK®, usually implement the framework's APIs. The hardware typically includes a dedicated hardware accelerator, also known as a deep learning accelerator (DLA). A DLA can be realized as using processor such as, a central processing unit (CPU), a graphics processing unit (GPU), an application-specific integrated circuit (ASIC), or a field-programmable gate array (FPGA). A typical AI job includes some computational functions that are not AI functions, where such functions are not processed by DLA.

Although the DLA is typically implemented in hardware, the management and control of certain tasks is performed in software. Specifically, in an architecture that includes a number of dedicated hardware (HW) accelerators, there is a need to manage and control the jobs to be executed by the different accelerators. The management of jobs (or tasks) is performed using processes implemented and executed by software. The management includes managing various queues, scheduling of jobs, load balancing of jobs, preparing the input data in the hardware expected format, and interfacing and controlling a hardware programming model.

As the management of AI jobs is primary performed in software, the functionality and the performance of the entire DLA's architecture is limited by the maximum capacity of the CPU that is running the software responsible for such processes. That is, for example, a dedicated hardware processor, or DLA, for processing an AI job, would be stalled while waiting for the scheduling of an AI job by a software process. Thus, true acceleration of the processing of AI jobs cannot be fully achieved.

It would be, therefore, advantageous to provide an AI acceleration solution that would overcome the deficiencies mentioned above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for use with an artificial intelligence (AI) sequencer that is at least partially circuitry implemented and is adapted to be coupled to a plurality of AI accelerators via electronic connection. The method comprises: dispatching by the AI sequencer, using the electronic connection, an initial stage of an AI job having a plurality of stages to at least one of the AI accelerators for execution of the initial stage, wherein the AI job includes multiple AI functions; upon completion of the initial stage, receiving the AI job back at the AI sequencer; and after receiving the AI job back at the AI sequencer, dispatching by the AI sequencer, using the electronic connection, a next stage of the AI job to at least one different one of the AI accelerators; wherein the AI sequencer dispatches each AI function of the AI job at computer speed over the electronic connection to minimize any possible idle time of the AI accelerators.

Certain embodiments also disclosed herein include a method for use with an artificial intelligence (AI) sequencer that is at least partially circuitry implemented and is adapted to be coupled to a plurality of AI accelerators via electronic connection to process an AI job having a plurality of AI functions, the AI sequencer comprising a plurality of schedulers, the method comprising: receiving, by the AI sequencer, the AI job, the AI job being sent to the AI sequencer for execution by an application; scheduling, by each of at least two of the plurality of schedulers, each of at least one of the AI functions of the AI job so that each of the at least one of the AI functions are to be executed by respective ones of the AI accelerators in parallel; and dispatching by the AI sequencer, using the electronic connection, the each of at least one of the AI functions to respective ones of the AI accelerators for execution in parallel thereby; wherein the scheduling is performed so that the AI sequencer dispatches each AI function of the AI job at computer speed over the electronic connection to minimize any possible idle time of the AI accelerators.

Certain embodiments also disclosed herein include an artificial intelligence (AI) sequencer adapted to be coupled to a plurality of AI accelerators, the AI sequencer, comprising: a queue controller comprising logic configured to manage a plurality of queues for maintaining data of a plurality of different AI jobs for each of which a request to employ at least one of the AI accelerators is received, wherein an AI job includes at least one AI functions; a plurality of schedulers that are configured to schedule execution of at least one of the AI jobs that is associated with the data maintained by the plurality of queues for the one AI job; a plurality of job processing units (JPUs), wherein each of the plurality of JPUs is configured to generate an execution sequence for the one of the AI jobs based on a received AI job descriptor for the one of the AI jobs; and a plurality of dispatchers connected to the plurality of AI accelerators, wherein each of the plurality of dispatchers is configured to dispatch at least an AI function of one of the AI jobs from the plurality of queues to one of the AI accelerators, wherein each AI function is dispatched to one of the AI accelerators in an order determined by the execution sequence created for each respective one of the AI jobs; wherein the AI sequencer is at least partially circuitry implemented and is couplable to the AI accelerators via electronic connection; wherein the AI sequencer operates to dispatch each AI function of the AI job at computer speed to minimize any possible idle time of the AI accelerators; and wherein, the AI sequencer operates to dispatch at least two of the AI functions of an AI job so that at least at one point in time different ones of the AI accelerators are each executing an AI function of a single AI job in parallel.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
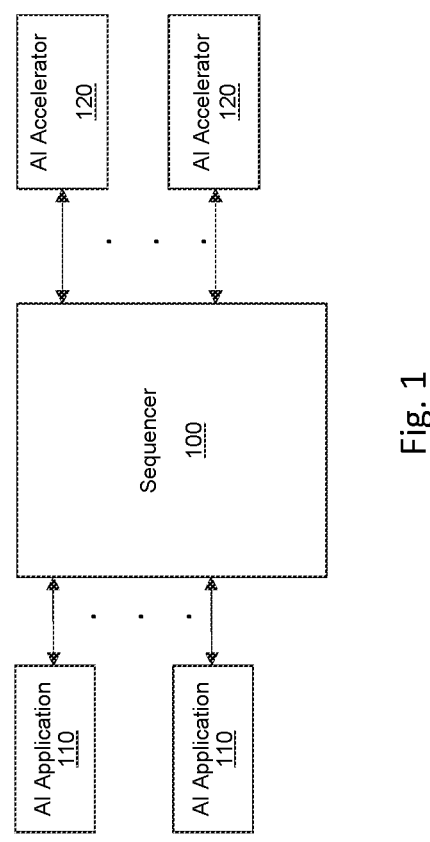
FIG. 1 is a schematic diagram utilized to describe the operation of an AI sequencer, according to an embodiment.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments allow for the acceleration and execution of AI applications in datacenters while reducing the total cost of ownership (ToC) of datacenters. According to the disclosed embodiments, an AI sequencer is disclosed. The AI sequencer (or simply a sequencer) is configured to control and manage the data flow of one or more hardware accelerators. This allows efficient job scheduling in a hardware pipeline. Such pipeline partitions distribute and feed AI computational tasks (or jobs) into different computation elements in a sequence, while providing the data for computational element readiness prior to execution. As such, the computational element has minimal idle time, if any. The AI computational tasks may be received from a remote application through the network.

FIG. 1 is an example diagram illustrating the operation of the sequencer 100 according to an embodiment. The sequencer 100 is configured to receive requests to perform AI jobs (tasks) from one or more applications 110. The requests may be received over a network (not shown), typically over a fast transport protocol. An example for such a protocol may include RDMA, TCP, over Ethernet, or the like. In an embodiment, the requests may be received from a server executing the applications 110, coupled to the sequencer 100 via a communication bus (e.g., a PCIe connection, or the like).

An application 110 may be hosted on an application server, an AI appliance, and the like. An application 110 may require some processing by an AI (or machine learning) module, and some accompanying functions, such as pre-processing, post-processing, or accompanying processing functions. Such processing is referred to herein as an "AI Job". An AI job may include, for example, machine learning, deep learning, and neural network processing tasks, for various type of applications including, for example, natural language processing (NLP), voice processing, image processing, and video processing, with various usage models including, for example recommendation, classification, prediction, and detection. In addition, tasks may also include preprocessing and postprocessing computation, for examples image (jpeg) decoding, non-maximum suppression (NMS) after-object detection, and the like.

The sequencer 100 further supports functions including, without limitation, flow management, static or dynamic routing decisions, job multicasting, job batching, data manipulation, QoS of AI tasks (i.e., priority, starvation prevention, latency, and the like), control plane manipulation, partition sequencing and execution of a computational graph framework (e.g., TVM, GLOW, and OpenVX), flow control, statistical computation, and the like, as well as any combination thereof. A function may include an AI computing process or a non-AI computing process.

The sequencer 100 is configured to send the AI jobs to one or more AI accelerators 120. An accelerator is a dedicated processor configured to perform a specific function, thus offloading the processing of an AI job from the application host CPU or the AI-server host CPU. An AI accelerator 120 may include one or more neural network core processors, a GPU, an FPGA, a DSP (or multiple DSP cores), one or more video codec core processors, one or more CPU processor cores, a deep neural network (DNN) accelerator, and the like. It should be noted that the accelerator 120 can support acceleration of tasks that are not AI tasks.

The AI job may include multiple functions and may be processed in the AI accelerators in multiple stages. Upon completion of each stage, the job is returned to the sequencer 100 for rescheduling of the following functions of the job. It should be noted that the data, control, or both, can flow from an accelerator to the sequencer 100, or can flow through a sideband mechanism. An AI accelerator 120 that completes the processing of an AI Job returns the processing results to the sequencer 100, which, in return, provides the results (or responses) to the application(s) 110 requesting the execution of the respective job. The data itself may be transferred directly to the final destination through a network, for example, using a RDMA protocol or a local bus.

The AI job may also continue its execution on a different accelerator. This may be the case for a concatenated or parallel execution of an AI job. When an AI job is processed in parallel, the results are sent back to the application upon completion of processing of the entire job. In addition, an AI job can be processed in parallel by multiple schedulers and accelerators connected over the network. The processing results are sent to the application once completed by all sequencers. In another configuration, the accelerators are coupled to the sequencer 100 via a local communication bus.

The sequencer 100 is configured to manage and schedule execution of the AI Job, and to provide a correct or efficient sequence to perform an AI job. To this end, as will be discussed in more detail below, the sequencer 100 is configured to manage a set of queues to temporarily hold received AI Jobs. The sequencer 100 is further configured to schedule the next queue to serve and build an execution sequence to the AI job, and push the job to the appropriate AI accelerator or accelerator(s) 120.

Such accelerators 120 push their processing results directly to queues in the sequencer 100. The execution sequence includes a full sequence of operations required to execute an AI job. The sequencer 100 is configured to manage all the operations in the execution sequence until receipt of all final results from the AI accelerators 120.

In an embodiment, the architecture of the sequencer 100 is a flexible hardware architecture that manages and controls the AI accelerators 120. In an example configuration, the sequencer 100 includes programmable micro-processors and hardware circuits for queue management, scheduling, dispatching, classification, arithmetic functions, data structure manipulations, hardware and software handshakes, semaphores and interface emulation, and other needed functions to execute the control and management of the flow. Further, the AI sequencer can be configured according to specific execution schemes provided by a computation graph or another program format, or functionality can be dynamic and depend on the data.

In another example configuration, the sequencer 100 has a unique architecture that incorporates both hardware processors and codes executed by micro-processors to process incoming AI jobs with high performance and high flexibility.

In an embodiment, the sequencer 100 is configured to implement a high-speed network interface (not shown in FIG. 1). Such an interface is configured to receive the jobs from clients, either through the network or other interfaces like the host, arrange the data in the memory (local or external), and send a descriptor with the information about the AI job to the sequencer 100, which is later parsed to gather the AI Job information through the sequencer. The sequencer's 100 response is sent back to an AI client (application) through the received interface.

In an embodiment, the sequencer's 100 response (i.e., the processing results) is encapsulated in the network traffic, according to the header provided by the sequencer 100.

In an embodiment, the architecture of the sequencer 100 is an adaptable structure that can support any accelerator with any activation function, or computational graphs as described above. To support the adaptable structure, the sequencer 100 includes a configurable hardware adapter to match the accelerator's 120 requirements that can activate the respective accelerator 120. In an embodiment, the sequencer 100 may further include codes executed on the micro-processors that can be adapted to meet the requirements of any accelerator 120. The code may include software, middleware, and/or firmware. In some configurations, the sequencer 100 can support internal accelerators integrated in the sequencer 100. The connection between the (external) accelerator 120 and the sequencer 100 may be through a dedicated bus (such as PCI, ePCI, and the like), a network connection, and the like.

Figure 2:
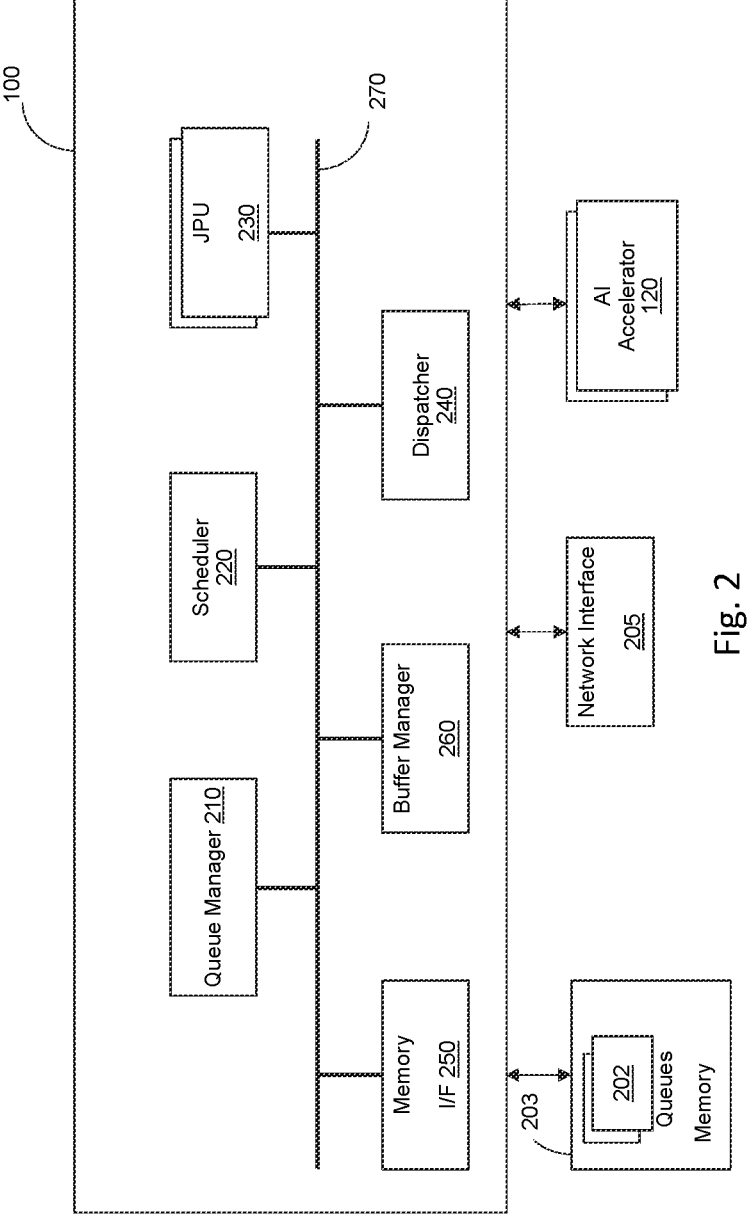
FIG. 2 is a block diagram of the sequencer, implemented according to an embodiment.

FIG. 2 is an example block diagram of the sequencer 100, designed according to an embodiment. The sequencer 100 includes a queue manager 210, a scheduler 220, a plurality of job processing units (JPUs), collectively referred to as JPUs 230 or as a JPU 230, a dispatcher 240, a memory interface 250 that can be accompanied with a caching system, and a buffer manager 260. The sequencer 100 is configured to interface with external components including a memory 203, the AI accelerators 120, and a network interface 205 providing connectivity to a network (not shown). In an example configuration, some or all of the external components may be integrated in the sequencer 100. In some configurations, the sequencer 100 is not connected to the network, and jobs are received from an application executed by a server hosting the sequencer 100.

The queue manager 210 is configured to hold the information of all queues 202 in the sequencer 100. The queues 202 are data structures saved in the memory 203. Queues 202 are used as an asynchronous media interfaces, between their inputs and outputs, so they allow the asynchronous feeding of the jobs coming from the network into the AI accelerators, and feeding the various accelerators through the pipeline execution stage. The queues 202 may assign different functionalities, such as input, output, and service queues, or may be assigned to dedicated component (e.g., a network interface or a general processor). The queue manager 210 may also share multiple queues 202 to include data of the same job.

The memory 203 is a memory of a device (e.g., a DLA server) hosting the sequencer 100. In some configurations, the memory 203 may be part of the sequencer 100.

In an embodiment, the sequencer 100, by means of a JPU 230, is configured to generate an execution sequence for each job. An execution sequence determines the various functions to be performed in order to complete the job. This allows for performance of some of the functions by the JPUs 230 and distribution of the processing of various functions to multiple accelerators.

For example, an AI job may be an object classification in an image. The sequence may include resizing an image, object detection, and object classification of each identified object. The resizing is a function (not an AI process), and can be performed by a JPU, the object detection is a function performed by an accelerator, and each object classification is a function performed by a different accelerator (thus, multiple objects can be classified in parallel or in cascade by order).

In an embodiment, the execution sequence is generated based on a certain computational graph. The graph is built from the code of the AI job using a compiler (not shown). The graph is implemented by each JPU 230. The compiler is configured to analyze the code and create the execution sequence adapted to the computational elements and orchestrated by the sequencer.

In an example embodiment, the compilation may include a Just In time (JIT) operation that adapts a graph to a specific runtime condition, such as resources currently being utilized. As an example, the execution sequence is generated so that it would allow for load balancing of resources among free computational elements.

The execution sequence can include pre/post processing functions. Further, the execution sequence can address multiple functions in parallel in case the graph includes parallel vertices for execution. Further, the execution sequence can define a number of independent sequences to support execution of separate functions. This would allow for parallelized execution on available resources (e.g., accelerators), while maintaining high utilization and load balancing of the resources based on predefined SLA requirements for the service and resources.

In an embodiment, all queues 202 are configured with a unified format and each queue's information is stored in a dedicated management table (not shown) in the memory 203. The queue manager 210 directly interfaces with the queues 202, where components are written or read from the queues 202, and requests the queue manager 210 to perform such operations. In an embodiment, after each operation, in the queues 202, the queue manager 210 is configured to update entries of the management table with respect to an operation made. The operation may include writing to a queue, reading from a queue, de-queuing a selected queue, and the like.

The scheduler 220 is configured to take a scheduling decision on a group of queues 202, thereby selecting the next queue to serve. The selected queue is then matched to an available JPU 230 or an available AI accelerator 120, through a queue interface or a direct interface. Once scheduling completes, a dequeue operation is performed on the selected queue and the data (descriptor) is sent to the selected JPU 230 through a respective interface. The scheduler 220 may utilize different scheduling policies, such as round robin, weighted round robin, and the like.

In one configuration, the scheduler 220 has multiple scheduling levels with different group types of queues. All the possible groups/types of queues are configured, and parts of the queue descriptor are saved in the management table. As an example, the grouping of queues may be based on Quality of Service (QOS). Groups can have hierarchies of priority level, client level, and service provider level. Another example is a group that is scheduled for load balancing spraying between multiple entities. The group of available JPUs per type/task is also configurable and can change dynamically. In an embodiment, a JPU 230 is realized as a programmable microprocessor JPU core. The JPU 230 can execute a program (or a process) and can access the memory 203 and the other components of the sequencer 100.

In an embodiment, JPUs 230 can be divided into groups, where each group can execute different codes or a set of instructions. This allows for assignment of groups of JPUs 230 for specific tasks and responsibilities for stages in the data-path pipeline. The number of groups and the number of JPUs 230 in each group is configurable to support the sequencer's scheduling scheme and policies.

Each JPU 230 is configured to receive the AI job descriptor, decide on the next operation (in the sequence) to be executed, and send the AI job descriptor to a destination component performing the next operation. A destination component may include a queue manager 210, the network interface 205, and an AI accelerator 120.

In an embodiment, each JPU 230 is configured to perform the following operations: read a job descriptor, change a job descriptor, access a job's data in the memory 203, a change job's data, build an execution sequence, generate multiple descriptors from a single incoming descriptor (multicasting), batch multiple AI jobs to a single AI job, send such jobs to an accelerator 120, and un-batch a job to multiple jobs, splitting results of multiple operations to multiple smaller results. The operation of a JPU 230 is discussed in detail below.

A dispatcher 240 is a circuit configured to interface with any AI accelerator 120. A dispatcher 240 is configured to select an appropriate AI accelerator 120 to process an AI job, to activate, control, and manage the selected accelerator. In the embodiment shown in FIG. 2, multiple dispatchers 240 are available, where each dispatcher 240 is assigned to a designated AI accelerator 120, and is further configured to support the unique requirements and activation functions of its respective AI accelerator 120.

In an embodiment, a dispatcher 240 can push new jobs or read results from one or more accelerator-specific queues 202. A dispatcher 240 can allow access to the JPUs 230, and the respective accelerator's 120 memory space. A dispatcher 240 is configured to receive an AI job descriptor of an AI job to execute from the job processor, and to push the job dispatcher 240 to the accelerator 120 or to the queue manager 210.

The dispatcher 240 may also store the job for the AI accelerator, and the AI accelerator pulls the job information from the dispatcher 240 when it is ready. In such an embodiment, all metadata and data can already be available to the accelerator.

The memory interface 250 is configured to provide the interface to the memory 203. The memory interface 250 is configured to receive all the requests from the components of the sequencer 100 and to send such requests to the memory 203. To serve all memory requests, the memory interface 250 may implement an arbitration mechanism between the various components and handle all open requests until completion. The memory 203 may be composed of internal memories that are directly mapped or serve as cache and external memory. The memory 203 may be realized as a DRAM, Flash, and the like.

The buffer manager 260 is configured to hold multiple lists of free or used buffers in a system hosting the sequencer 100. Such lists serve to allocate and release buffers (with memory allocation in the memory sub-system). The lists are maintained per buffer size and can support various buffer sizes. The size of each list can be fixed or dynamically controlled.

The different components of the sequencer 100 can interact with the buffer manager 260 to request a new buffer (memory allocation), or to release a used buffer (memory de-allocation) that is no longer needed. The buffer manager 260 is the central reservation center for buffers in the system, and maintains updated status on allocation of buffers in the system.

In an embodiment, the queue manager 210, scheduler 220, JPUs 230, dispatcher 240, memory interface 250, and the buffer manager 260 are connected via a bus 270. The bus 270 may be a fast inter-connect bus, such as PCI. In some configurations, the memory 203, and AI accelerators 120, and/or the network interface 205 are also connected to the bus 270. The bus may be a local bus, or may be distributed between multiple devices encapsulated and carried over various network protocols. Examples for such protocols include, for example, Ethernet, InfiniBand, and the like, or the AI-over-Fabric (AIoF) protocol.

In an embodiment, the sequencer's 100 architecture allows concatenation of multiple functions for scalable execution of AI jobs with multiple hierarchies and in multiple capacities while ensuring predefined SLA.

An AI accelerator 120 may include one or more neural network core processors, a DSP (or multiple DSP cores), one or more video codec core processors, one or more CPU processor cores, and the like. The network interface 205, in an example embodiment, may implement an AI over fabric (AIoF) protocol. The AIoF protocol is a communication protocol designed to support AI service, AI model installations, and other AI operations. The AIoF protocol is configured for reduced latency associated with a TCP overhead and the multiple data copies required to transfer data over the network. In an embodiment, the AIoF protocol is configured using a shared memory over a network, in which the application can use its memory while the hardware transparently copies the job data from the application's memory to the memory 203 via the network. In other configurations, the network interface 205 provides an interface to a communication protocol, such as Transmission Control Protocol (TCP), remote direct memory access (RDMA), RDMA over converged Ethernet (ROCE), InfiniBand, and the like.

The sequencer 100 and/or its various components may be realized as one or more hardware logic components and circuits. For example, and without limitation, illustrative types of hardware logic components that can be used include: field programmable gate arrays (FPGAs), application-specific integrated circuits (ASICs), application-specific standard products (ASSPs), system-on-a-chip systems (SOCs), general-purpose microprocessors (CPUs), microcontrollers, digital signal processors (DSPs), and the like, or any other hardware logic components that can perform calculations or other manipulations of information. Software executed by a hardware logic component shall be construed broadly to mean any type of instructions, whether referred to as software, firmware, middleware, microcode, hardware description language, or the like. Instructions may include code (e.g., in source code format, binary code format, executable code format, or any other suitable format of code).

Figure 3:
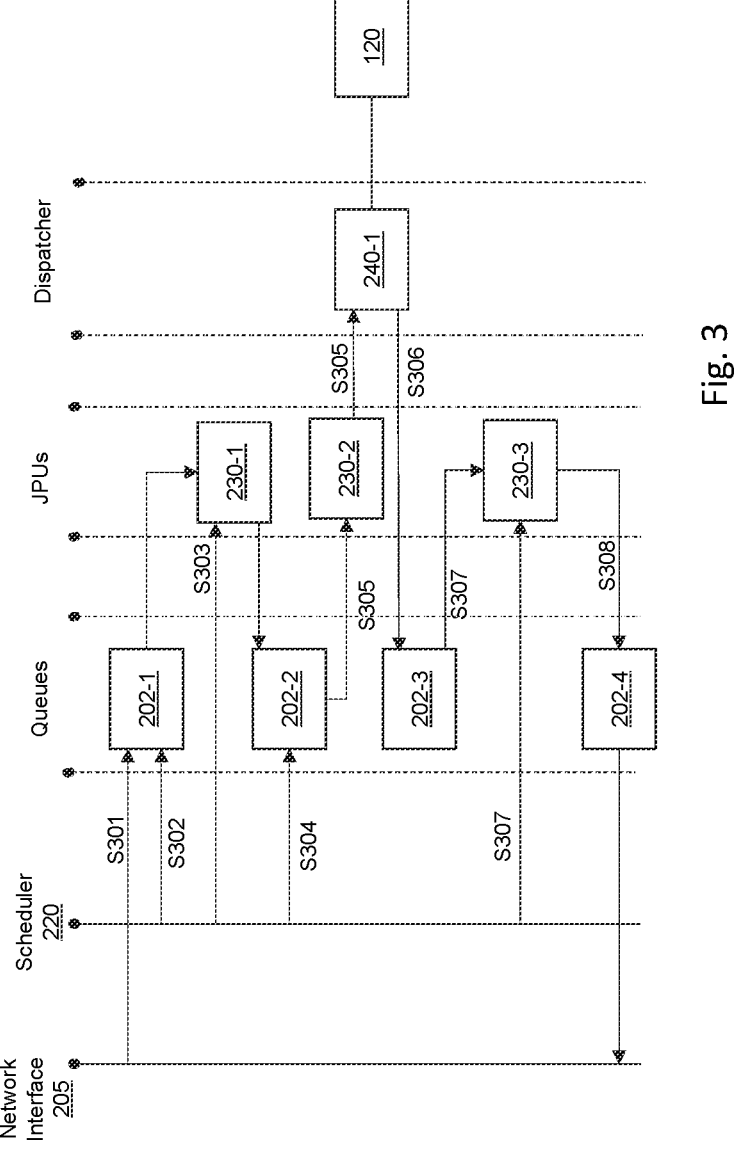
FIG. 3 illustrates an example flow for mapping a job sequence to the sequencer, according to an embodiment.

FIG. 3 shows an example diagram showing an execution pipeline for mapping a job sequence to the sequencer 100, according to an embodiment. FIG. 3 will be discussed with reference to the elements shown in FIG. 2.

The sequencer 100 is designed with a highly flexible architecture that enables pipelining the data path without instantiating additional JPUs and memory. The connectivity option and the configurable resource allocation enable emulation of a full pipeline with multiple stages of operations. As demonstrated in FIG. 3, data path flow in the sequencer 100 can enable parallel processing of tasks at each stage. Further, each stage can be configured to use a specific number of queues and a specific number of JPUs. The programmability of the JPUs ensures highly efficient flexibility with high performance.

At S301, an AI Job is received over the network and pushed to a queue 202-1 under the control of the queue manager 210. Examples for AI jobs are mentioned above.

At S302, a scheduler 220 selects a queue (in this example, queue 202-1) to process and assign the AI job in the selected queue to a free JPU 230-1.

At S303, the JPU 230-1 is configured to generate an execution sequence for a job. The execution sequence is saved in the memory. The JPU 230-1 then pushes the job to a queue 202-2 with an AI accelerator as its destination. The job in the queue 202-2 is saved with the requested priority and class of service. In an embodiment, the selected AI accelerator is based on the type of AI job. For example, for DSP processing, a DSP accelerator is the destination. The generation of execution sequences is discussed above.

At S304, when it is time to process the data in the queue 202-2, the scheduler 220 schedules the queue 202-2, and assigns a free JPU 230-2 to process the AI task.

At S305, the JPU 230-2 may pre-process the data of the AI job and modify the descriptor of the job. Preprocessing may include formatting or modifying the data so as to have the data ready for processing by the accelerator. Then, the JPU 230-2 pushes the pre-processed job to a dispatcher 240-1 associated with the destination accelerator 120 (e.g., a DSP processor). In an embodiment, when data preprocessing is not required, S304 and S305 are not performed and data is sent directly to the accelerator 120.

At S306, the processing results are saved by the accelerator 120 in a results queue 202-3.

At S307, the scheduler 220 is configured to schedule the processing of the results queue 202-3 and assign a JPU 230-3 to post-process the data in the results queue 202-3.

At S308, the JPU 230-3 post processes the results in the queue 202-3, modifies the descriptors, and pushes the results to an output queue 202-4. It should be noted that pre-processing and post-processing refer to processing before and after the accelerator. In example embodiment, the post-processing may include formatting the data into a format required by the next accelerator for a specific job and modifying the descriptor of the job. Alternatively, the processing of data my include preparing the data for the format of transmission in the network. In yet another embodiment, the post-processing can also include computational stage (acceleration) operation on the data that is relevant for the AI Job execution and can be performed by the JPU 230-3.

At S309, the results in the output queue 202-4 may be sent over the network to the application requesting to processing the AI job. The data can also proceed to another stage of AI acceleration. In an embodiment, the data is not queued in the output queue, but, rather, is sent directly to another accelerator.

It should be noted that the queues 202-1 through 202-4 are not detected queues but are enumerated to merely illustrate selection of empty queues. Such selection is performed under the control of queue manager 210. It should be further noted that the JPU 230-1, 230-2, and 230-3 are not dedicated JPUs severing a specific function. Such JPUs are enumerated to merely illustrate selection of free JPUs. The selection is made by the scheduler 220.

FIGS. 4 through 7 represent possible execution sequence scenarios that the sequencer 100 supports, according to an embodiment. Each stage in an execution sequence can be performed by the same accelerator or a different accelerator.

Figures 4, 5:
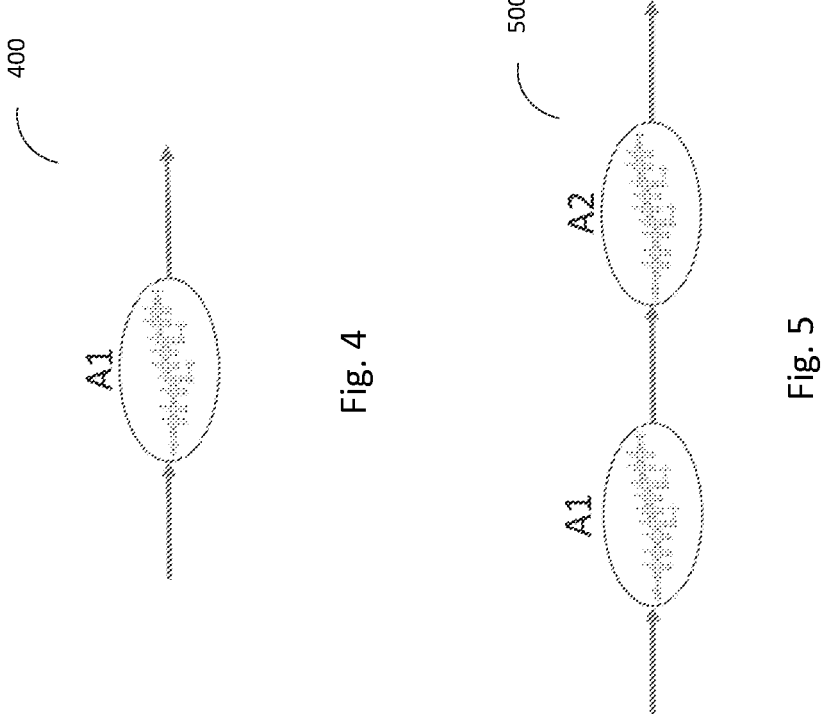
FIGS. 4, 5, 6, and 7 illustrate example execution sequences processed by the sequencer.

FIG. 4 shows an execution sequence 400 with a single function that is executed in the sequencer 100 by a single accelerator, and subsequent sending of the result to an application requesting the AI job.

FIG. 5 shows a two-stage execution sequence 500. There are 2 functions (A1 and A2) that are executed, one by each accelerator, which may or may not be the same accelerator. The input to the second function (A2) is the output of the first function (A1). At the end of the second function (A2), execution of the result goes to the application requesting the AI job.

Figures 6, 7:
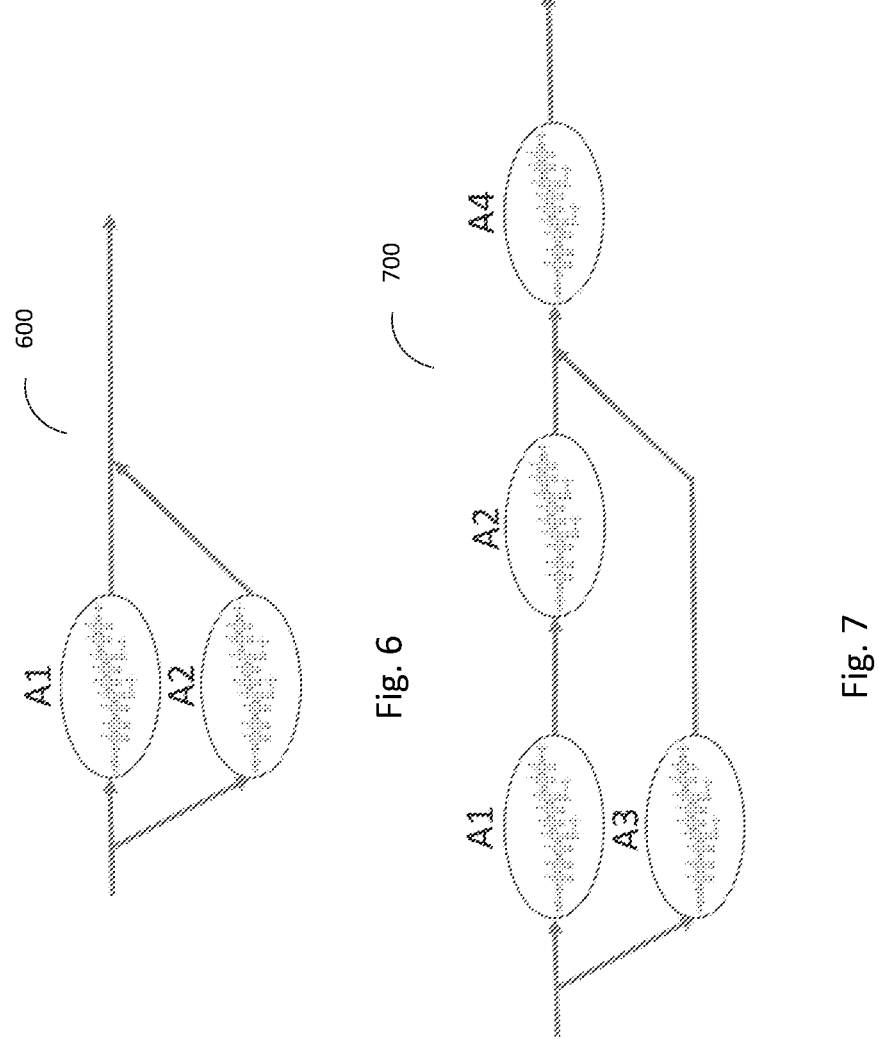

FIG. 6 shows a two-stage parallel execution sequence 600. The input is sent to two accelerators that execute the two functions in parallel (A1 and A2). The execution can be performed on different accelerators or the same accelerators, in different instances. The execution of each of the functions can be performed at different times with different execution lengths. The sequencer 100 is configured to collect the output from the 2 parallel functions (A1 and A2) and, only once processing of both functions are completed, send the result to the application requesting the AI job.

FIG. 7 shows a sequence 700 including parallel stages followed by a stage to adjoin results. This is an example of the combination shown in FIGS. 4, 5, and 6. There are four functions that need to be executed in the flow by the accelerators. Function A1 and Function A2 are executed in sequence (A2 following A1). Function A3 is executed in parallel to the execution of A1 and A2. Once functions A2 and A3 complete execution (both of them), their outputs are sent to execution by function A4. Once function A4 completes its execution, the final result is sent to the application requesting the AI job. In an embodiment, the parallel functions can be sent to two different accelerators at the same time.

It should be noted that some embodiments are discussed herein with reference to CNN tasks, but the disclosed embodiments are applicable to any neural network tasks, including, without limitation, preprocessing or postprocessing that can be executed in DSP kernels CPUs, or video/voice codecs, or other tasks implemented by any of the accelerators in the system.

It should be further noted that the sequencer 100 architecture, and its functionality as discussed herein, can be implemented by deep learning accelerator (DLA) or AI-SoC systems. Examples for such DLA systems are discussed below.

Figure 8:
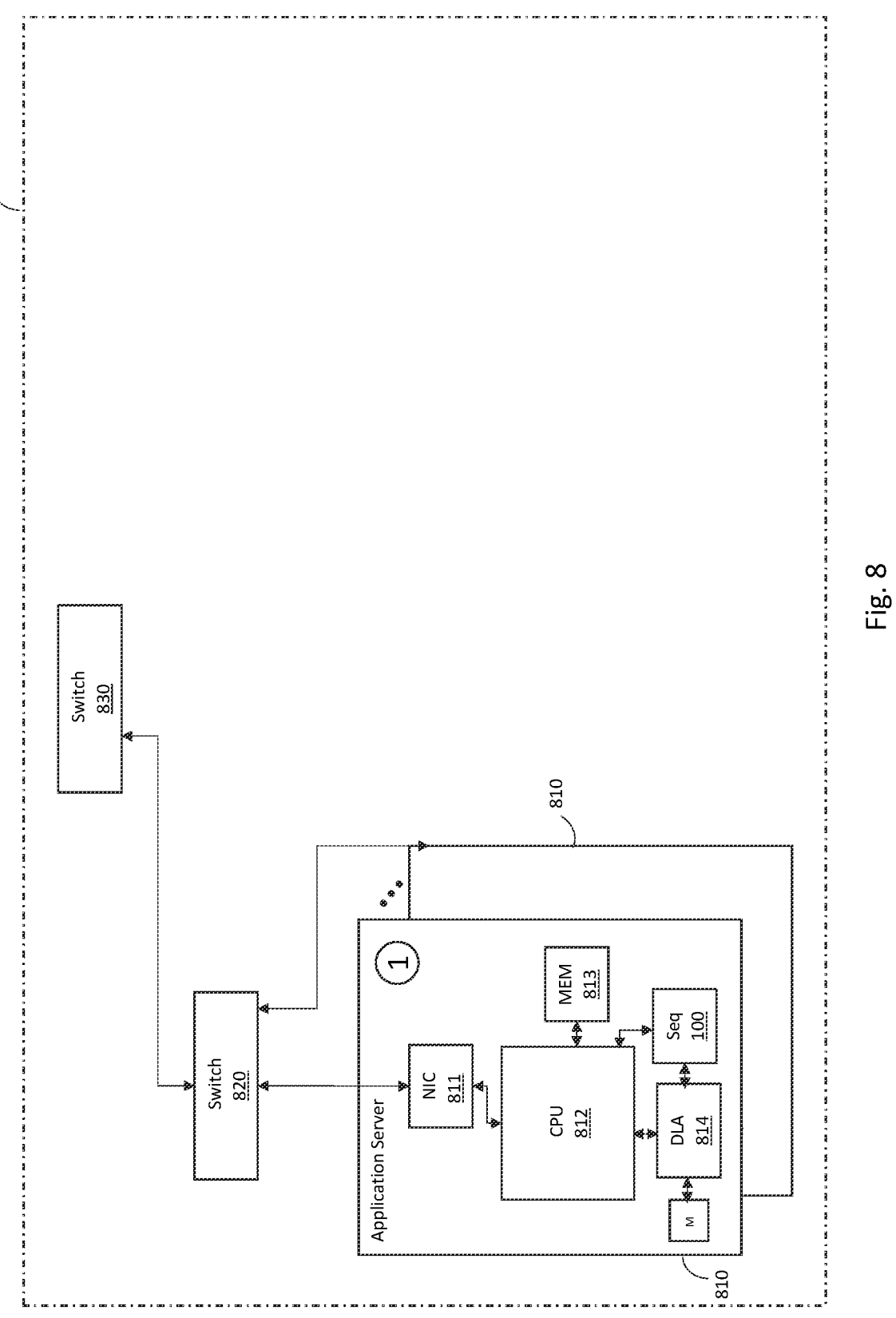
FIGS. 8, 9, 10, and 11 are diagrams of DLA systems in which the sequencer can be integrated.

FIG. 8 shows a schematic diagram of the architecture of a conventional local attached DLA system 800 for executing artificial intelligence (AI) applications. The system 800 is arranged as a local direct-attached DLA architecture, having a plurality of application servers 810 connected through an Ethernet switch 820. The Ethernet switch 820 directs and routes traffic among the application servers 810. An Ethernet switch 830 directs and routes traffic in and out of the system 800.

In the local direct-attached DLA architecture shown in FIG. 8, each application server 810 includes a network interface card 811 and a CPU 812 coupled to a memory 813. The CPU 812 is a host CPU being coupled to a DLA 814 having its memory (M).

The DLA 814 is typically an AI Accelerator designed to accelerate execution of AI applications, such as deep learning, using neural networks. The DLA 814 is typically realized as a GPU, FPGA, or ASIC. The DLA 814 is connected to the host-CPU 812 through a PCIe bus (not labeled). In the system 800, an application is executed by the host-CPU 812, where deep-learning jobs are off-loaded to the DLA 814. The DLA 814, in an embodiment, includes the sequencer 100 to accelerate the execution of such jobs.

Figure 9:
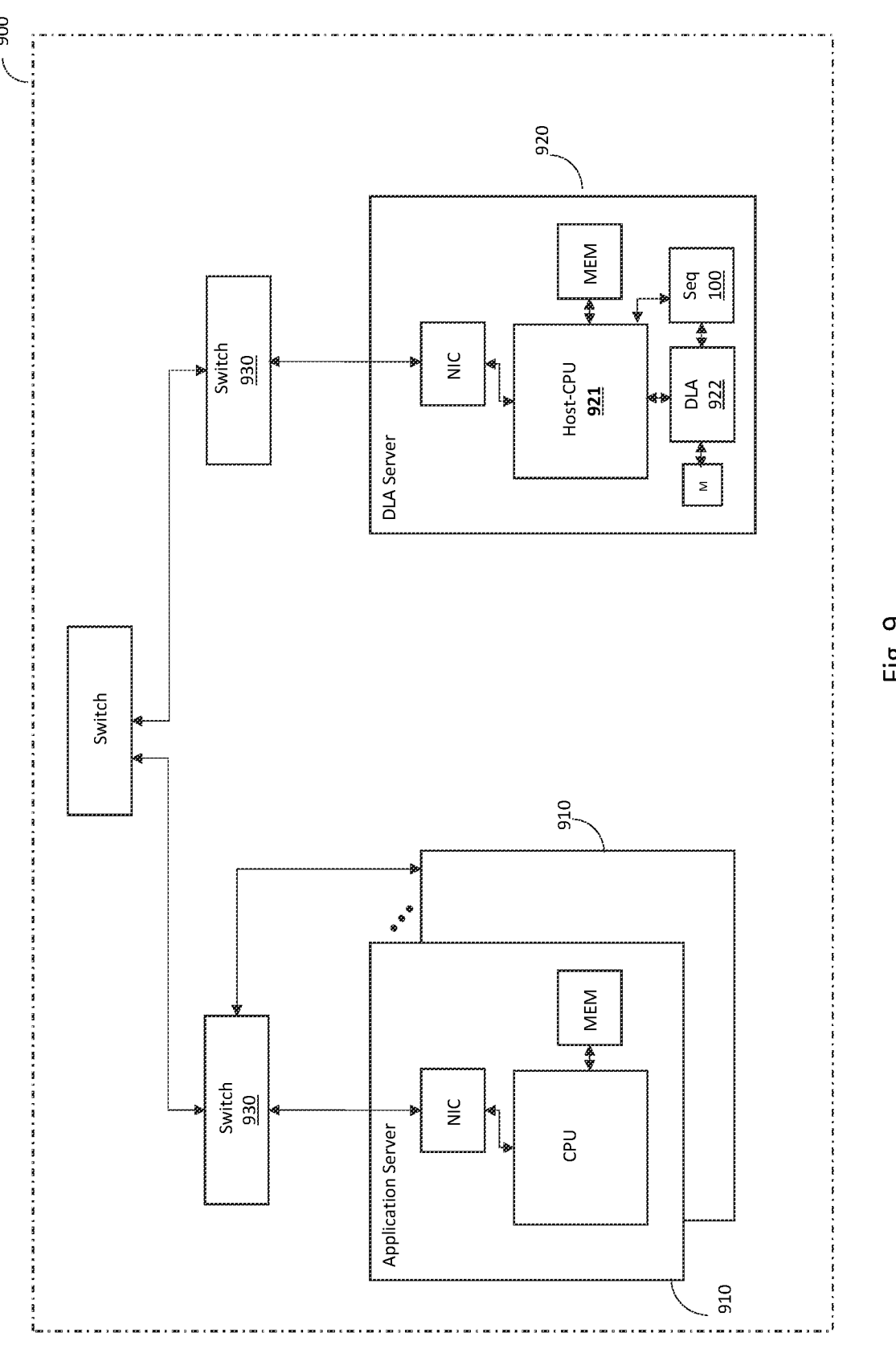

FIG. 9 shows an architecture of a system 900 for executing AI applications in a remote direct-attached DLA system 900, according to an embodiment.

The remote direct-attached DLA system 900 includes a plurality of application servers 910 and a DLA servers 920 connected over a network switch 930. Each application server 910 executes an AI application over an AI software framework. Further, each application server 910 communicates with a DLA server 920 that executes specific deep-learning tasks. The DLA server 920 includes a host-CPU 921 executing the AI framework and a direct-attached DLA 922. The DLA 922 is the same as the DLA discussed above. The remote direct-attached DLA system 900 balances the workloads of applications running on the host-CPU 921 and the AI workload running on the DLA 922.

In an embodiment, the sequencer 100 is included or implemented in the DLA 922 to accelerate the execution of AI jobs (or tasks).

Figure 10:
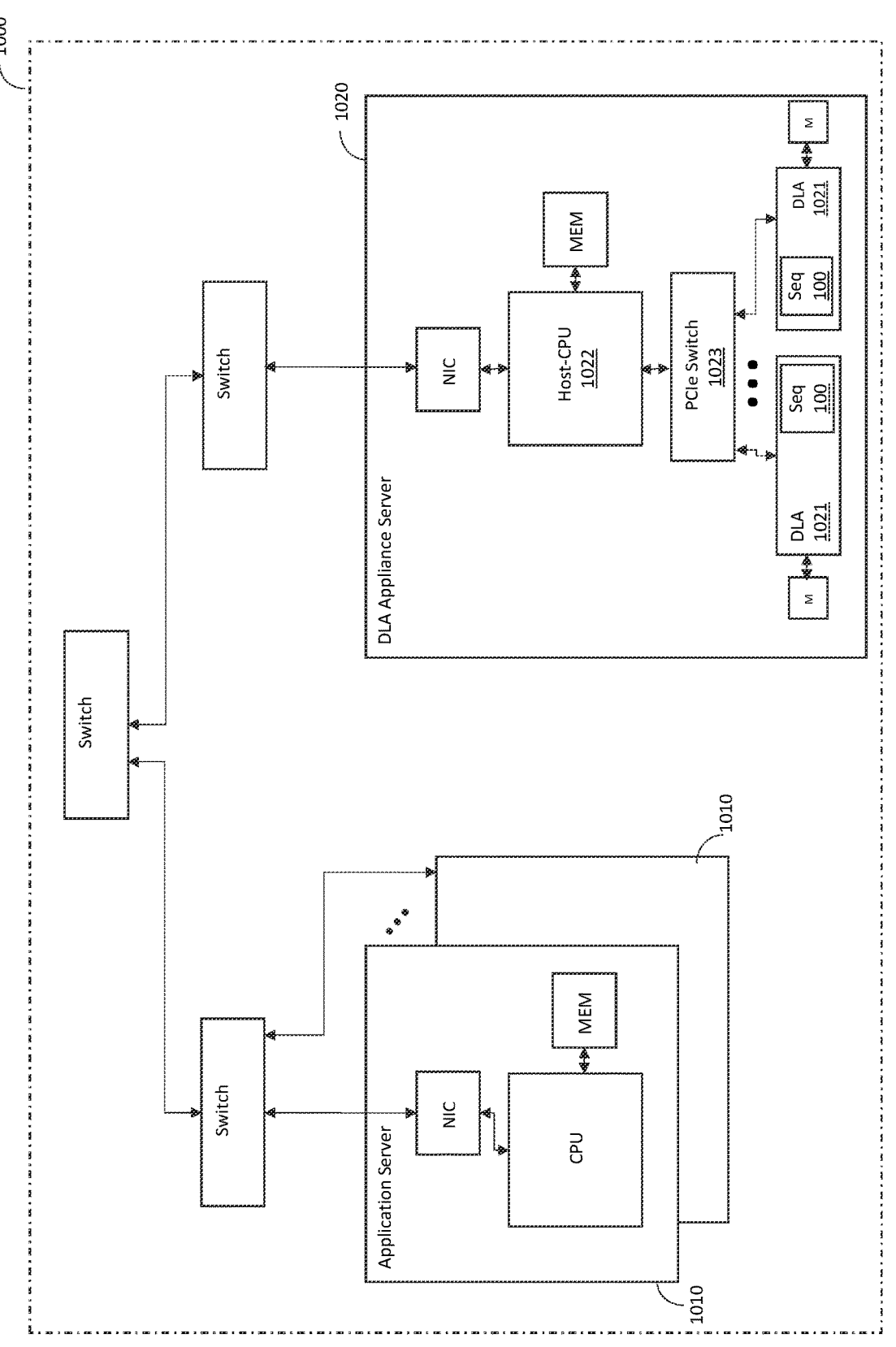

FIG. 10 shows an architecture for a remote direct-attached DLA system 1000 implementing the sequencer.

The DLA appliance server 1020 includes a plurality of DLAs 1011 coupled to a host-CPU 1022 through an ePCI switch 1023. The system 1000 balances the workloads discussed above. However, the system 1000 suffers from higher latency due to data path and computation bottlenecks between the host-CPUs 1022 and the DLAs 1021. The operation of the system 1000 also requires multiple data copies between the application requesting a deep-learning task and the DLA 1021 allocated to execute the requested task. The multiple data copies increase the latency and power requirements of the entire system.

In an embodiment, a DLA appliance based on a network-attached AI accelerator (hereinafter "NA-AIA") is disclosed. The NA-AIA provides computation and network capabilities that are required to transfer the AI models and data (to be executed), in addition to the host-CPU computation that is needed to manage and control the AI-specific tasks. As will be demonstrated below, the NA-AIA removes the computation and communication bottlenecks, thus providing a scalable solution.

In an embodiment, the sequencer 100 is included or implemented in the DLA 1021 to accelerate the execution of AI jobs (or tasks). The AI jobs are received from the application servers 1010.

Figure 11:
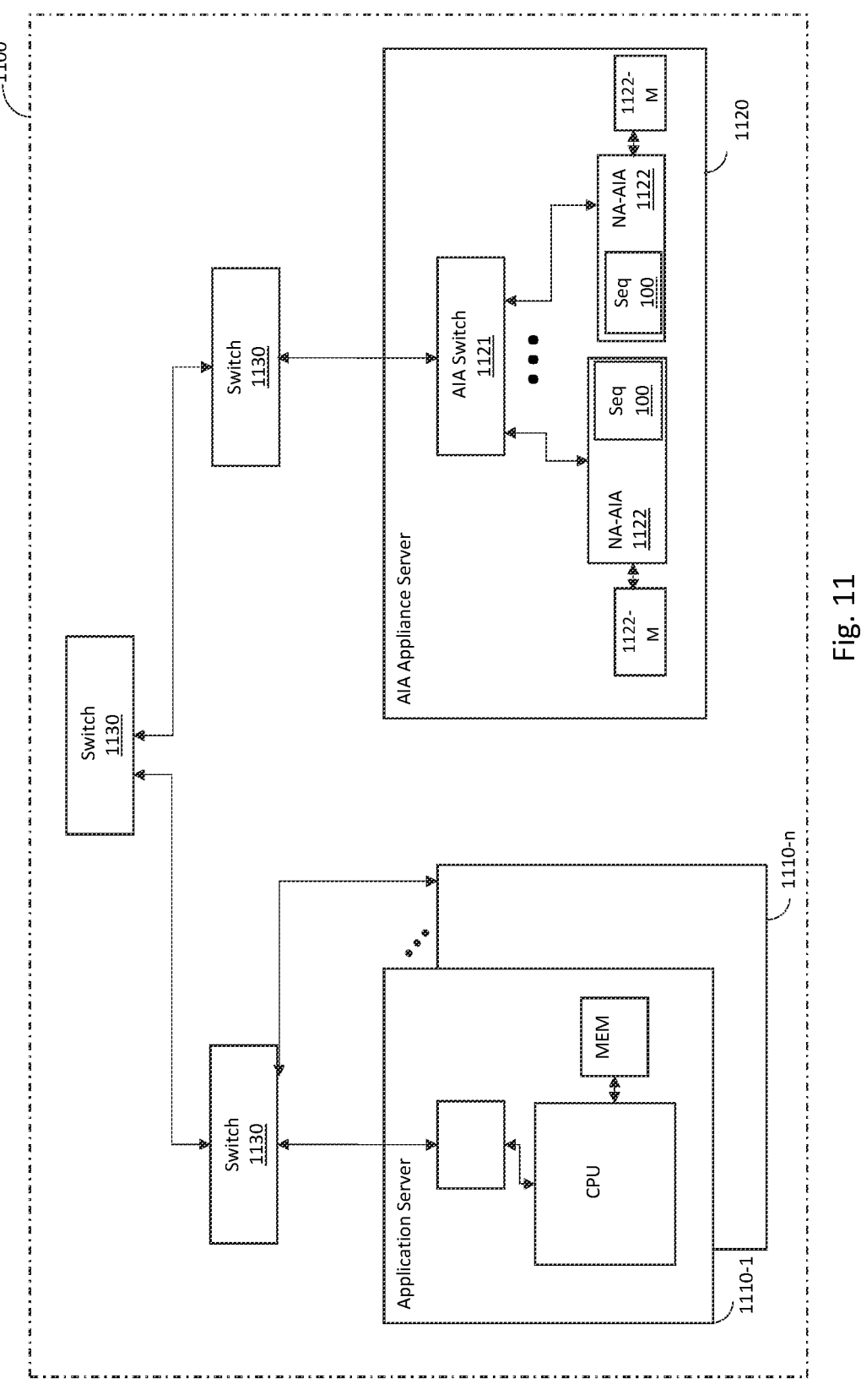

FIG. 11 shows an example diagram of a remote direct-attached acceleration system 1100 arranged according to an embodiment. The system 1100 is utilized to accelerate the operations of AI processing tasks including, but not limited to, deep-learning tasks.

The system 1100 includes a plurality of application servers 1110, at least one AIA appliance server 1120, and a number of switches 1130 connecting the various components of the system 1100. In an embodiment, each of the switches 1130 is an Ethernet switch.

Each application server 1110 executes an AI application over an AI software framework. Such a framework may be, for example, TensorFlow®, Caffe, Pytorch®, or CNTK®, and the like.

Each application server 1110 further communicates with the DLA appliance server 1120 that executes specific AI processing tasks. The DLA appliance server 1120 is designed according to the disclosed embodiments to accelerate the execution of the AI tasks. The AIA appliance server 1120 may include, in one configuration, an AIA switch 1121 with a plurality of NA-AIAs 1122. Each NA-AIA 1122 is coupled to its own memory 1122-M. The AIA switch 1121 may be an Ethernet switch.

The system 1100 provides a scalable solution as there are no computation and communication bottlenecks. In the system 1100, additional NA-AIAs can be connected to the switch 1121, thereby expanding the switch 1121 to the AIA appliance server 1120. The switch 1121 is configured to have enough ports and bandwidth to allow data traffic to be transferred flawlessly between the application servers 1110 and the AIA appliance server 1120.

In an embodiment, further acceleration may be achieved by utilizing a proprietary protocol (AI over fabric, or AIoF). The AIoF protocol is a communication protocol designed to support AI model installations and AI operations. The AIoF protocol removes the TCP overhead, latency issues, and the multiple data copies required to transfer data from the application server 1110 to the appliance. In an embodiment, the AIoF protocol is configured using a shared memory over a network, in which the application can use its memory while the hardware transparently copies the AI model or the data from the application memory to an NA-AIA's memory via the network.

In an embodiment, the sequencer 100 is included or implemented in the DLA appliance server 1120 to accelerate the execution of AI jobs (or tasks).

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit, and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for use with an artificial intelligence (AI) sequencer that is at least partially circuitry implemented and is adapted to be coupled to a plurality of AI accelerators via electronic connection to process an AI job having a plurality of AI functions, the AI sequencer comprising a plurality of schedulers, the method comprising:

receiving, by the AI sequencer, the AI job, the AI job being sent to the AI sequencer for execution by an application;

scheduling, by each of at least two of the plurality of schedulers, respectively, each of at least one of the AI functions of the AI job so that each of the at least one of the AI functions are to be executed by respective ones of the AI accelerators in parallel; and dispatching by the AI sequencer, using the electronic connection, the each of at least one of the AI functions to respective ones of the AI accelerators for execution in parallel thereby;

wherein each AI accelerator is a dedicated processor configured to process a specific AI function of the AI job; and wherein the scheduling is performed so that the AI sequencer dispatches each AI function of the AI job over the electronic connection to minimize any possible idle time of the AI accelerators.

2. The method of claim 1, wherein the electronic connection is implemented by a network.

3. The method of claim 1, wherein results of the AI job are sent by the AI sequencer to the application upon completion of the AI job.

4. The method of claim 1, wherein any of the AI accelerators that completes an AI function provides processing results of the AI function to the AI sequencer.

5. The method of claim 1, wherein the scheduling is based on a computational graph received by the AI sequencer.

6. The method of claim 1, wherein at least one of the AI accelerators belongs to the AI sequencer and at least one other of the AI accelerators belongs to a different AI sequencer and wherein results of the AI job are sent by one of the AI sequencers to the application upon completion of the AI job by all of the AI sequencers.

7. An artificial intelligence (AI) sequencer adapted to be coupled to a plurality of AI accelerators, the AI sequencer, comprising:

a queue controller comprising logic configured to manage a plurality of queues for maintaining data of a plurality of different AI jobs for each of which a request to employ at least one of the AI accelerators is received, wherein an AI job includes at least one AI functions;

a plurality of schedulers that are each configured to schedule execution of at least a respective one of the AI jobs that is associated with the data maintained by the plurality of queues for the one AI job;

a plurality of job processing units (JPUs), wherein each of the plurality of JPUs is configured to generate an execution sequence for the one of the AI jobs based on a received AI job descriptor for the one of the AI jobs; and a plurality of dispatchers connected to the plurality of AI accelerators, wherein each of the plurality of dispatchers is configured to dispatch at least an AI function of one of the AI jobs from the plurality of queues to one of the AI accelerators, wherein each AI function is dispatched to one of the AI accelerators in an order determined by the execution sequence created for each respective one of the AI jobs;

wherein the AI sequencer is at least partially circuitry implemented and is couplable to the AI accelerators via electronic connection;

wherein the AI sequencer operates to dispatch each AI function of the AI job to minimize any possible idle time of the AI accelerators; and wherein, the AI sequencer operates to dispatch at least two of the AI functions of an AI job so that at least at one point in time different ones of the AI accelerators are each executing an AI function of a single AI job in parallel.

8. The AI sequencer of claim 7, wherein the electronic connection is implemented by a network.

9. The AI sequencer of claim 7, wherein results of a particular AI job are sent by the AI sequencer to an application that requested execution of the particular AI job upon completion of the particular AI job.

10. The AI sequencer of claim 7, wherein any of the AI accelerators that completes an AI function provides processing results of the AI function to the AI sequencer.

11. The AI sequencer of claim 7, wherein the scheduling is based on a computational graph received by the AI sequencer.

12. The AI sequencer of claim 7, wherein the queue controller, the plurality of schedulers, the plurality of JPUs, and the plurality of dispatchers are interconnected by a bus.

13. The AI sequencer of claim 7, wherein at least one of the AI accelerators belongs to the AI sequencer and at least one other of the AI accelerators belongs to a different AI sequencer and wherein results of a particular AI job are sent by the AI sequencer to an application that requested execution of the particular AI job upon completion of the particular AI job by all of the AI sequencers.

\* \* \* \* \*